(12) United States Patent
Harmer et al.

(10) Patent No.: US 8,060,481 B1
(45) Date of Patent: Nov. 15, 2011

(54) TIME INDEXED FILE SYSTEM

(75) Inventors: Craig K. Harmer, San Francisco, CA (US); John A. Colgrove, Los Altos, CA (US); Peter Vajgel, Menlo Park, CA (US); Milind Borate, Pune (IN); Bhimsen Bhanjois, Santa Clara, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1130 days.

(21) Appl. No.: 11/439,302

(22) Filed: May 23, 2006

Related U.S. Application Data

(60) Provisional application No. 60/695,612, filed on Jun. 30, 2005.

(51) Int. Cl.
*G06F 7/00* (2006.01)
*G06F 12/00* (2006.01)
*G06F 17/00* (2006.01)

(52) U.S. Cl. ........ 707/695; 707/822; 707/830; 711/154; 711/161; 711/170

(58) Field of Classification Search ........................ None
See application file for complete search history.

(56) References Cited

U.S. PATENT DOCUMENTS

| | | | | |
|---|---|---|---|---|
| 2002/0078244 | A1* | 6/2002 | Howard | 709/248 |
| 2006/0047932 | A1* | 3/2006 | Anderson et al. | 711/162 |
| 2006/0053157 | A1* | 3/2006 | Pitts | 707/102 |
| 2006/0123209 | A1* | 6/2006 | Borland | 711/162 |
| 2006/0179083 | A1* | 8/2006 | Kulkarni et al. | 707/204 |
| 2006/0179086 | A1* | 8/2006 | Najork et al. | 707/204 |
| 2006/0259728 | A1* | 11/2006 | Chandrasekaran et al. | 711/170 |
| 2007/0027937 | A1* | 2/2007 | McGrattan et al. | 707/204 |

OTHER PUBLICATIONS

Rowan, Michael; "Achieving Atomic Database Recovery"; Article; Revivio, Inc.; Copyright 2005.
"Continuous Data Protection: Business Continuity for the Era of Networked Storage"; White Paper; Aberdeen Group, Inc.,; Copyright 2003.
"Microsoft System Center Data Protection Manager"; Technical Overview; Microsoft Corporation; Copyright Mar. 2005.
Santry, Douglas S., Michael J. Feeley, Norman C. Hutchinson, Alistair C. Veitch, Ross W. Carton, and Jacob Ofir; "Deciding when to forget in the Elephant file system"; Article; Department of Computer Science University of British Columbia; 17th ACM Symposium on Operating Systems Principles (SOSP '99); Published as "Operating Systems Review," 34(5):110-123, Dec. 1999.
Tan, Yuen-Lin; "Comparison-based Filesystem Verification: The NFS Tee"; Thesis Paper; Carnegie Mellon University; 2004.

* cited by examiner

*Primary Examiner* — Alicia Lewis
(74) *Attorney, Agent, or Firm* — Rory D. Rankin; Meyertons, Hood, Kivlin, Kowert & Goetzel, P.C.

(57) ABSTRACT

A method and mechanism for managing a time-indexed block map in a file system configured to store multiple versions of file data. A file system includes inodes or other structures corresponding to files in the system. Responsive to creating a file, one or more blocks are allocated for use in storing the file data. A block map is maintained for the file and is updated to include an identification of the blocks storing the file data and a timestamp corresponding to the stored data. In response to creating a file, data corresponding block map is maintained. In addition, a new entry is created in the block map which identifies the newly allocated blocks. Further, an entry of the block map is updated to (i) identify the particular blocks to which the write was directed and (ii) include a timestamp corresponding to the time of the write.

17 Claims, 17 Drawing Sheets

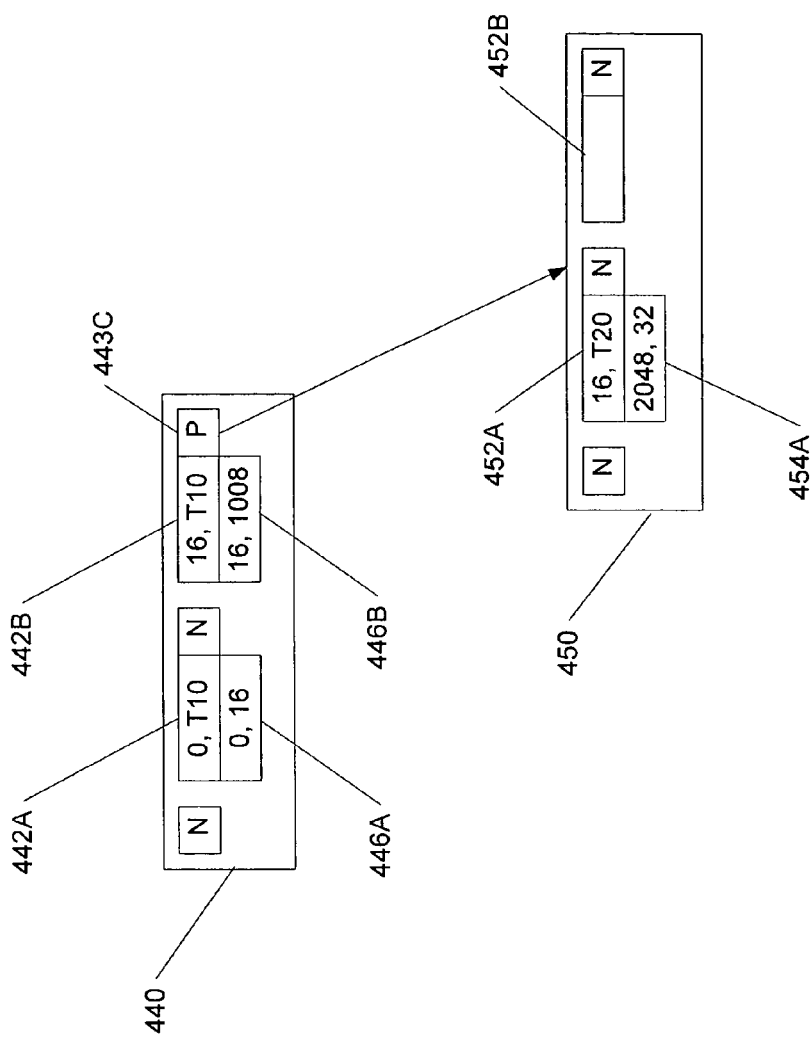

TIME INDEXED FILE SYSTEM

CROSS REFERENCE TO RELATED APPLICATIONS

This application claims the benefit of U.S. Provisional Application No. 60/695,612, entitled "Time Indexed File System", filed Jun. 30, 2005.

BACKGROUND OF THE INVENTION

1. Field of the Invention

The invention relates to computing systems and, more particularly, to file systems.

2. Description of the Related Art

As is well known, file system backups in computing systems may take a considerable amount of time and storage space. In many file systems, a significant portion of the data is not changed after its creation or after an initial period of access. Generally speaking, the conventional approach to data backup includes periodically performing a full backup of everything in the file system, for example once a week or once a month, and performing incremental backups between full backups, for example every day. Typically, this conventional approach makes a copy of all of the data in the file system, even though a large percentage of that data may not have changed since the previous full backup. In order to perform a restore from a previous backup, the most current full backup is typically restored, and then any changed data since the full backup is restored from incremental backups performed subsequent to the current full backup.

While a variety of backup and restore approaches similar to that above are available, such approaches may not meet the needs of a particular enterprise. Given that data may only be backed up on a periodic basis, numerous versions of a given file may have come and gone between backups and may not be recoverable. In addition, performing a conventional restore operation tends to be very time consuming and often results in recovery of far more data than is requested. Consequently, in recent years, alternative approaches to data protection have arisen. In particular, approaches sometimes referred to as "Continuous Data Protection" (CDP), or "continuous backup", have arisen to meet the needs of enterprises. In addition, versioning file systems have been proposed and developed to address some of the above described concerns.

In contrast to conventional approaches to backup and restore, continuous data protection may typically involve the use of additional hard drive storage to mirror main storage and also keep an up to date record of changes to the data storage in a continuous, and time based, manner. Should data corruption occur, a state of the data immediately prior to the corruption may be identified and used to restore the data. As the approach is generally hard drive based, restoration may be achieved in a relatively quick manner as compared to restoration from tape. In addition, as changes to data are monitored and recorded in a generally real-time manner, all changes or versions a given file may be recoverable. Accordingly, continuous data protection approaches may address some of the perceived problems with conventional backup and restore approaches. It is noted that CDP is typically used to enhance the data protection abilities of a given enterprise, rather than replace traditional backup and restore operations. Consequently, periodic backups of a more conventional type may continue to be performed.

On the other hand, versioning file systems are generally configured to retain earlier versions of files within the file system. By maintaining earlier versions of files, it may be possible to recover data from a previous known good state in the event, of data corruption. As may be appreciated, the granularity of prior versions retained, and the length of time prior versions are retained, may have a significant impact on the amount of data which must be maintained. Consequently, a variety of approaches exist for determining which versions to retain, and how existing data may be pruned to reduce the amount of data maintained.

As may be appreciated, file systems and the amount of data being backup up or otherwise protected may be very large. Consequently, catalogs, indices, and other metadata associated with such data can also be very large. For example, catalogs for some large file systems may exceed 500 GB. For an enterprise utilizing the enhanced capabilities of continuous data protection, or a versioning file system, there may exist certain expectations. One of the advantages of such data protection schemes is the rapidity with which a restore operation may be performed. As the amount of metadata can be very large, and can include very large numbers of objects or entities (e.g., some identifiable object for every change that occurs with respect to the data being protected), management of the metadata itself is an important factor in overall system performance. In addition, the particular approach used for managing the metadata may also impact how much space is required for the metadata.

Accordingly, an effective method and mechanism for retaining earlier versions of data in a file system is desired.

SUMMARY OF THE INVENTION

Methods and mechanisms for managing a time-indexed block map in a file system configured to store multiple versions of file data are contemplated.

Also contemplated is an extent-based file system which uses time-indexed block maps. In one embodiment, each entry of the block map includes (i) a key comprising an offset and a timestamp, and (ii) an identification of a particular extent. In response to detecting a write to an original extent of a file, the original extent is split and a new extent with new blocks is allocated which corresponds to the blocks of the original extent affected by the write.

In one embodiment, the original extent is split at the beginning and ending boundaries of the write. Accordingly, assuming a write to the "middle" of the original extent, the original extent is split into three portions—a first portion which precedes the newly modified blocks, a second portion which corresponds to the modified blocks, and a third portion which corresponds to the original blocks following the modified blocks. In one embodiment, the old data (i.e., the data in the original extent which is modified by the write) is copied from the original blocks to the newly allocated blocks, and the write data is stored in the original extent blocks. In such an embodiment, three new block map entries in addition to the original block map entry may be created. The original entry in the block map corresponding to the original extent updated to identify the first portion of the original extent resulting from the split. Two of the new block map entries are used to identify the second and third portions resulting from the split. Finally, the third new block map entry is utilized to identify the newly created extent. Each of the block map entries includes a timestamp which identifies the corresponding data.

In an alternative embodiment, rather than copying the old data (i.e., the data in the original extent which is modified by the write) from the original blocks to the newly allocated blocks, the new write data is stored in the newly allocated blocks and the corresponding block map entries have timestamp entries which appropriately corresponds to the identified data.

These and other embodiments, variations, and modifications will become apparent upon consideration of the following description and associated drawings.

BRIEF DESCRIPTION OF THE DRAWINGS

FIG. 4F depicts one embodiment of a time indexed block map stored in a B-tree.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Figure 1:
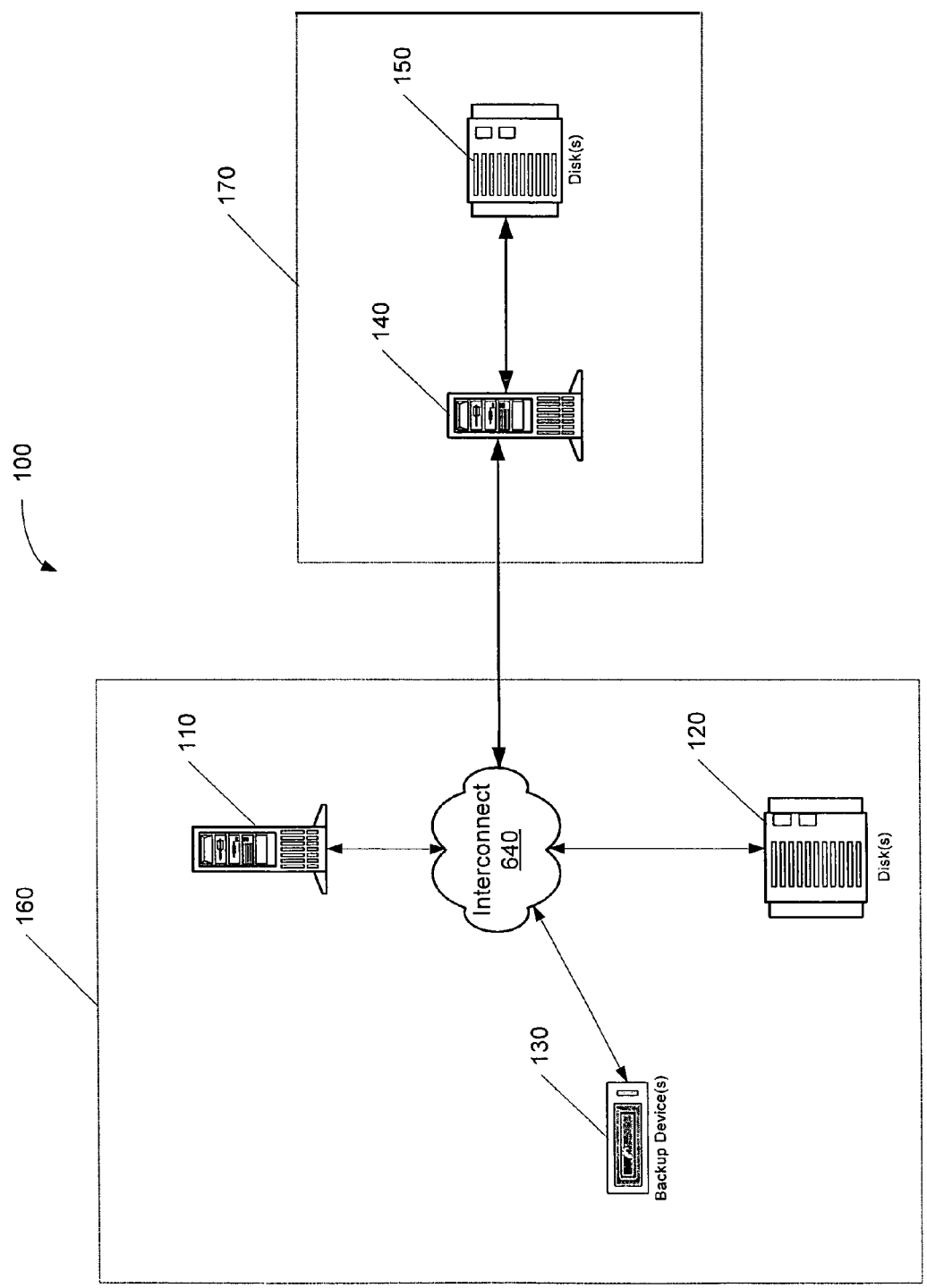
FIG. 1 depicts an overview of one embodiment of a computing system.

FIG. 1 depicts one embodiment of a computing system 100 configured to retain multiple versions of file system data. In the example of FIG. 1, a computing system 160 is shown which includes a computing device 110, network interconnect 640, primary storage device 120, and backup device 130. Computing device 110 may be any of various types of devices, including, but not limited to, a personal computer system, desktop computer, laptop or notebook computer, mainframe computer system, workstation, network computer, or other suitable device. Also shown in FIG. 1 is an additional system 170 coupled to interconnect 640. In general, numerous configurations of the system 100 shown in FIG. 1 are possible and are contemplated. In the example shown, system 170 includes a computing device 140 (e.g., a server) and directly coupled storage 150.

Computing device 110 is coupled via interconnect 640 to storage device 120 on which a file system may be implemented. Interconnect 640 may comprise, for example, a Storage Area Network (SAN), a volume manager, a LAN with Network-Attached Storage (NAS), or any network capable of coupling devices to a system 110. The storage device 120 may include any of one or more types of storage devices including, but not limited to, stand-alone storage devices ("disks"), storage systems such as RAID (Redundant Array of Independent Disks) systems, disk arrays, and JBODs (Just a Bunch Of Disks, used to refer to disk cabinets that do not have a built-in RAID controller). Backup device 130 may include any of one or more types of backup devices, including, but not limited to, various types of tape devices and optical storage devices. In addition, interconnect 640 may include one or more other networks, including wired or wireless networks, and may be coupled to one or more other devices (not shown) that may include one or more applications for accessing storage 120.

In the embodiment shown, system 110 may be configured to initiate backups of data from a file system stored on a storage device 120 to backup media on backup device 130. In addition, system 170 may be configured to provide mirror-like capabilities of the data on storage device 120. In one embodiment, as described in further detail below, primary storage 120 may include a file system which is configured to retain multiple versions of data corresponding to the files stored therein. The file system may be configured such that identification and retrieval of a particular version of a file (or files) may be accomplished in a relatively efficient manner. In addition to primary storage 120, storage 150 may be similarly configured with a file system configured to retain multiple versions of files. In such an embodiment, storage 150 may be configured to generally replicate or mirror storage 120. Accordingly, should primary storage 120 fail, or become corrupted, restoration using storage 150 may be possible. Those skilled in the art will appreciate there are numerous backup, restoration, mirroring, and other methods to protect data. All such alternatives are contemplated and may be utilized with the embodiments described herein.

As is well understood, various types of file systems exist and different operating systems may utilize different file systems. Generally speaking, a file system may be viewed as (i) a collection of files and (ii) information about those files. Depending on the particular system being used, the format of data files stored on a disk may assume some particular format. However, while such formats may vary, disks are typically composed of one or more platters with tracks of data which are subdivided into sectors. A particular track on all such platters is often referred to as a cylinder. In addition, each platter typically includes a head for reading data from, and writing data to, the platter. Consequently, in order to locate a particular block of data on a disk (i.e., an identifiable storage unit), the disk I/O controller must generally have the drive ID, cylinder number, read/write head number and sector number, or a block number. Other systems may be configured to use block numbers directly.

In addition to the above, each disk typically contains a directory or table of contents which includes information about the files stored on that disk. The directory generally includes information such as the list of filenames and their starting location on the disk. As an example, in the UNIX file system, every file generally has an associated unique "inode"

which indexes into an inode table. A directory entry for a filename will then have an associated inode which indexes into the inode table where information about the file may be stored. Generally, the inode encapsulates all the information about one file (except for its name, typically). Such information may include file size, dates of modification, ownership, protection bits, and location of disk blocks.

In other types of file systems which do not use inodes, file information may be stored directly in the directory entry. For example, if a directory contained three files, the directory itself would contain all of the above information for each of the three files. On the other hand, in an inode system, the directory only contains the names and inode numbers of the three files. To discover the size of the first file in an inode based system, you would have to look in the file's inode which could be found from the inode number stored in the directory. Numerous other approaches are possible and are contemplated.

Various approaches exist for recording changes to file system data. Two examples of such approaches include log structured file systems and journaling file systems. Log structured file systems are generally structured as a continuous log with the most recent changes being added to the end of the log. In the log structured file system, both data and metadata are written as part of the entry. Periodically, when all modified data and metadata has been written, the data on disk is consistent and the position in the log is marked as a consistency point. Recovery in log structured file systems after a system failure then typically involves reading the file system from the most recent consistency point.

In a journaling file system, planned modifications of file system metadata are first recorded in a separate "intent" log file which may then be stored in a separate location. Unlike a log structured file system, journaling typically involves logging only the metadata (though it may include data as well). If a system interruption occurs, it is only necessary to consult the journal to determine what modifications were left incomplete or corrupted and complete or roll-back those operations. With journaling, the intent log effectively allows the modifications to be "replayed". One difference between the journaling system and a log structured system is that the log structured file system moves from one discrete consistency point to another, whereas a journaling file system journals individual operations.

Figure 2A:
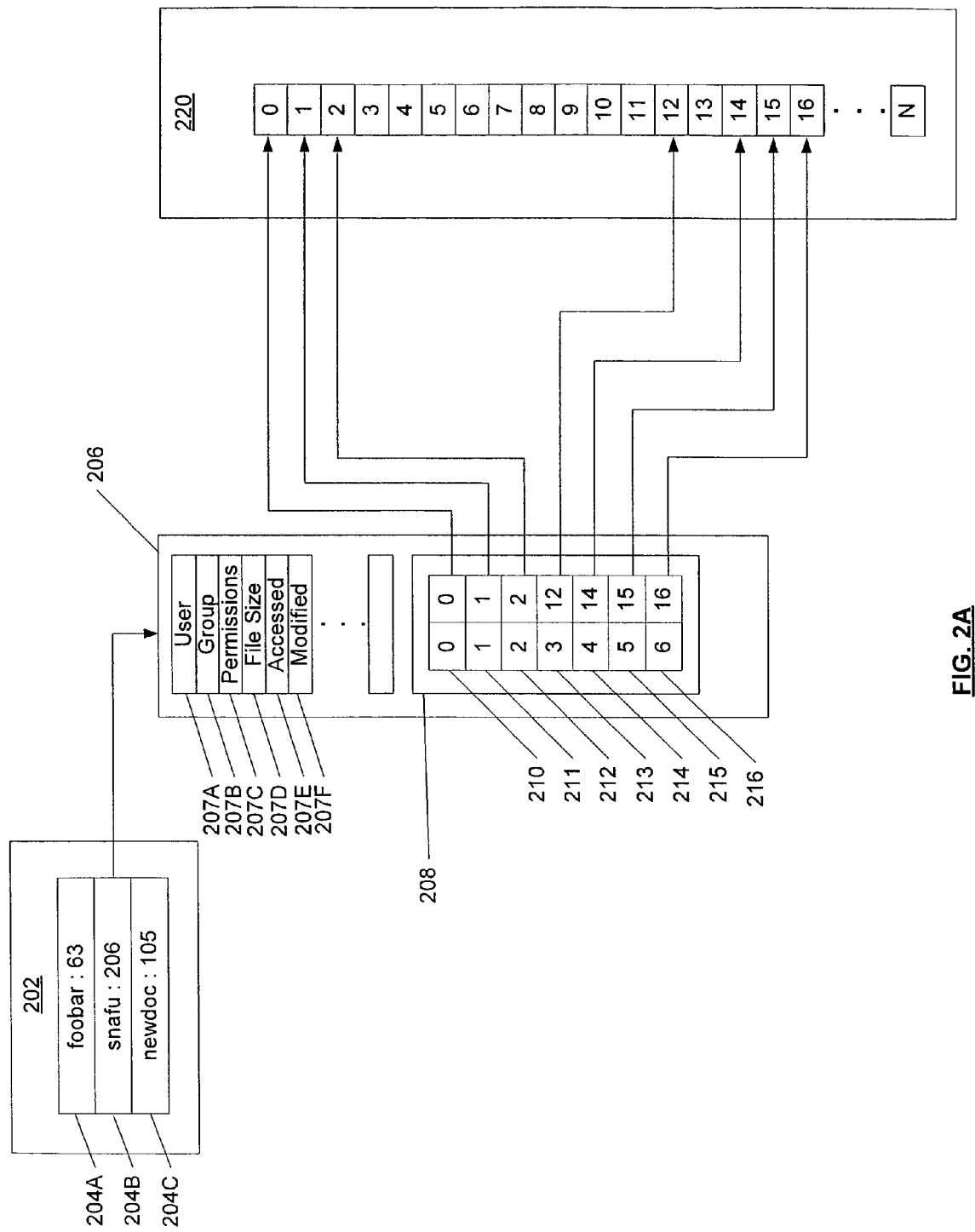
FIG. 2A depicts one embodiment of block based file system data.

In addition to such approaches, file systems allocate blocks of storage in different ways. For example, in a block-based allocation system, metadata corresponding to a particular file separately identifies each block which is allocated for use by the corresponding file data. In a system which uses an inode type approach as described above, the inode for a particular file may include a block map. The block map may then include an entry for every block allocated for the file. For example, FIG. 2A depicts one embodiment of a portion of a file system which utilizes block-based allocation. In FIG. 2A, a directory 202 is shown which includes multiple entries 204A-204C, each of which maps a Filename to a unique Inode (i.e., Filename:Inode). For example, entry 204A maps a file named "foobar" to an inode identified by the identifier "63", entry 204B maps a file named "snafu" to an inode identified by the identifier "206", and entry 204C maps a file named "newdoc" to an inode identified by the identifier "105". For ease of discussion, the identified inode "206" is similarly labeled in FIG. 2B. Also shown in FIG. 2A is a storage media 220 (e.g., a disk).

In FIG. 2A, inode 206 includes information corresponding to the file "snafu".

Included in the information are various attributes 207A-207F pertaining to the file. While any suitable collection of attributes may be utilized, common attributes include a user 207A which owns the file, groups 207B to which the user and/or file may belong, various permissions 207C, file size 207D, time of last access 207E, time of last modification 207F, and so on. Also shown in inode 206 is a block map 208. Storage media 220 is shown to include a plurality of blocks 0-N which may be allocated for storage. As the example of FIG. 2 corresponds to a block-based allocation system, block map 208 includes a separate entry for each of the blocks allocated for use by the file. Often, the block map entries may be indexed by an offset corresponding to the file data. For example, an offset may be used to indicate the offset of the data within the file, measured in units of disk blocks. Each entry may further include an identifier for a particular block on the media 220. The offset may then serve as a key which is used to obtain a corresponding block identifier. This key/block identifier tuple may then be used to locate the corresponding data. In this manner, various portions of the file are mapped to a particular block of storage on media 220. In this example, the block map 208 includes seven entries 210-216. Entries 210-212 correspond to offsets 0-2 and map to blocks 0-2, respectively, on media 220. Entry 213 corresponds to offset 3 which maps to block 12. Finally, Entries 214-216 correspond to offsets 4-6 which map to blocks 14-16, respectively.

Figure 2B:
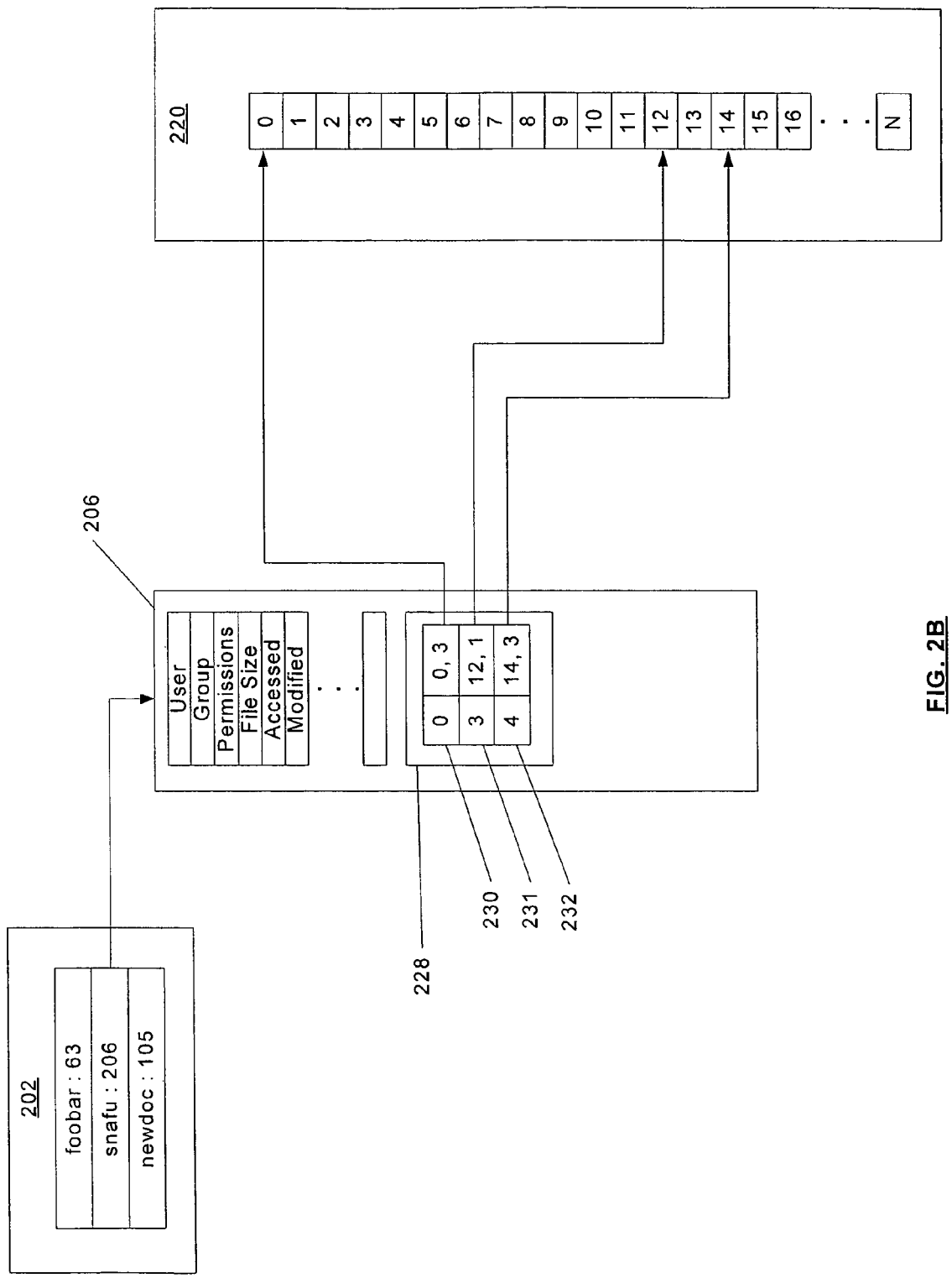
FIG. 2B depicts one embodiment of extent based file system data.

Another type of file system is the extent-based file system as illustrated by FIG. 2B. Extent based file systems allocate sequentially located groups of disk blocks at a single time. When a file is first written, a large number of blocks are allocated for the file and associated metadata is created. Subsequently, writes to a given file may be performed as writes to groups of sequential blocks. If all offsets modified by a write have associated data blocks allocated, then updates to the metadata may not be necessary. Only when a new extent is allocated is it generally necessary to update the metadata associated with a particular file. FIG. 2B depicts allocation of the same file data as that shown in FIG. 2A. As before, directory 202 maps file "Alpha" to inode 206. However, in this case, the block map 228 of inode 206 is different than the block map 208 of FIG. 2A. In this case, the block map 228 includes entries which map file offsets to one or more contiguous sequences of blocks. In particular, each entry of the block map 228 identifies an offset and an extent. For example, entry 230 corresponds to offset 0 and identifies an extent with starting block number "0" and length of 3. Therefore, offset 0 maps to blocks 0-2. Entry 231 maps offset 3 with starting block 12 and length of 1 (i.e., the single block 3). Finally, entry 232 maps offset 4 with three blocks beginning with block 14 (i.e., blocks 14-16). Accordingly, while the same blocks are allocated to the file as was the case in FIG. 2A, the method of storing the blocks in the block map is different.

Figure 3A:
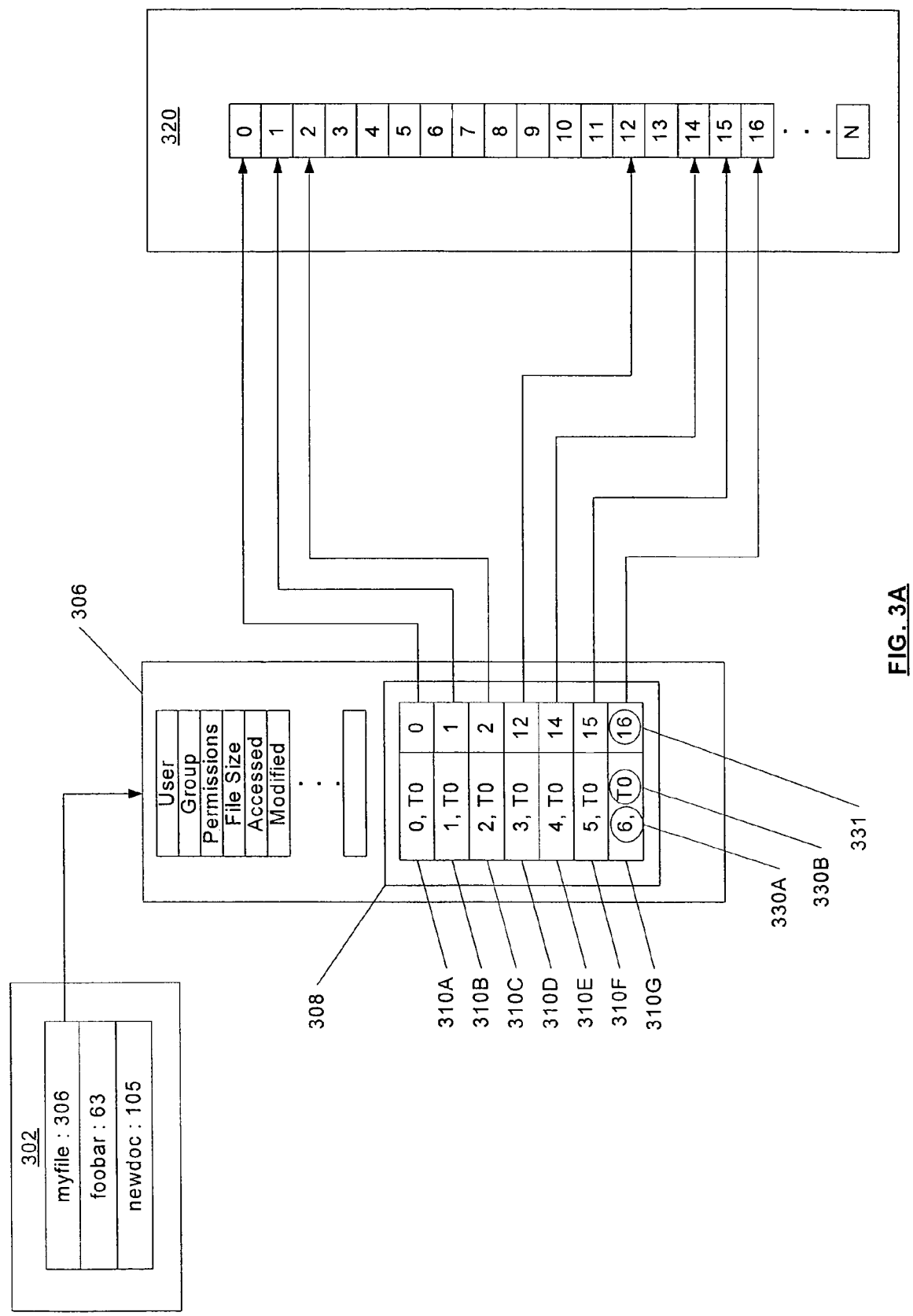
FIG. 3A depicts one embodiment of a portion of a time indexed block based allocation file system.

Turning now to FIG. 3A, one embodiment of a portion of a file system configured to use time indexed block maps is illustrated. In the discussion which follows, each of FIGS. 3A-3F generally correspond to time indexed block maps in a system utilizing block-based allocation. Similarly labeled elements of the figures generally identify corresponding elements within each. FIG. 3A shows a directory 302, inode 306, and storage media 320. In the example shown, the inode 306 includes a time indexed block map 308. The block map, for purposes of discussion, is shown to include seven entries 310A-310G. Each entry includes an index, or key, and an identifier which maps the key to a particular block within storage media 320. In contrast to the examples of FIGS. 2A-2B, the key not only includes an offset, but also includes a time stamp. For example, entry 310G is shown to have a key which includes an offset "6" 330A and timestamp "T0" 330B. Entry 310G further includes a corresponding identifier 331 which identifies a particular block of storage in media 320.

In the approach depicted in FIG. 3A, the timestamp within a particular key of an entry 310 indicates a time that data corresponding to the entry was modified. For example, entry 310A indicates that the data identified corresponding to offset "0" was modified or written at time "T0". Therefore, the data in block "0", as identified by entry 310A, was modified or written at time "T0". In this manner, each entry 310 may generally correspond to a particular version of the identified block of data. As data blocks are modified, new entries are created in the block map 308 for the revised versions of the blocks. Those skilled in the art will appreciate that timestamps may be used to represent a time corresponding to receipt of data, flushing of data, or any other time deemed suitable within a particular implementation.

Figure 3B:
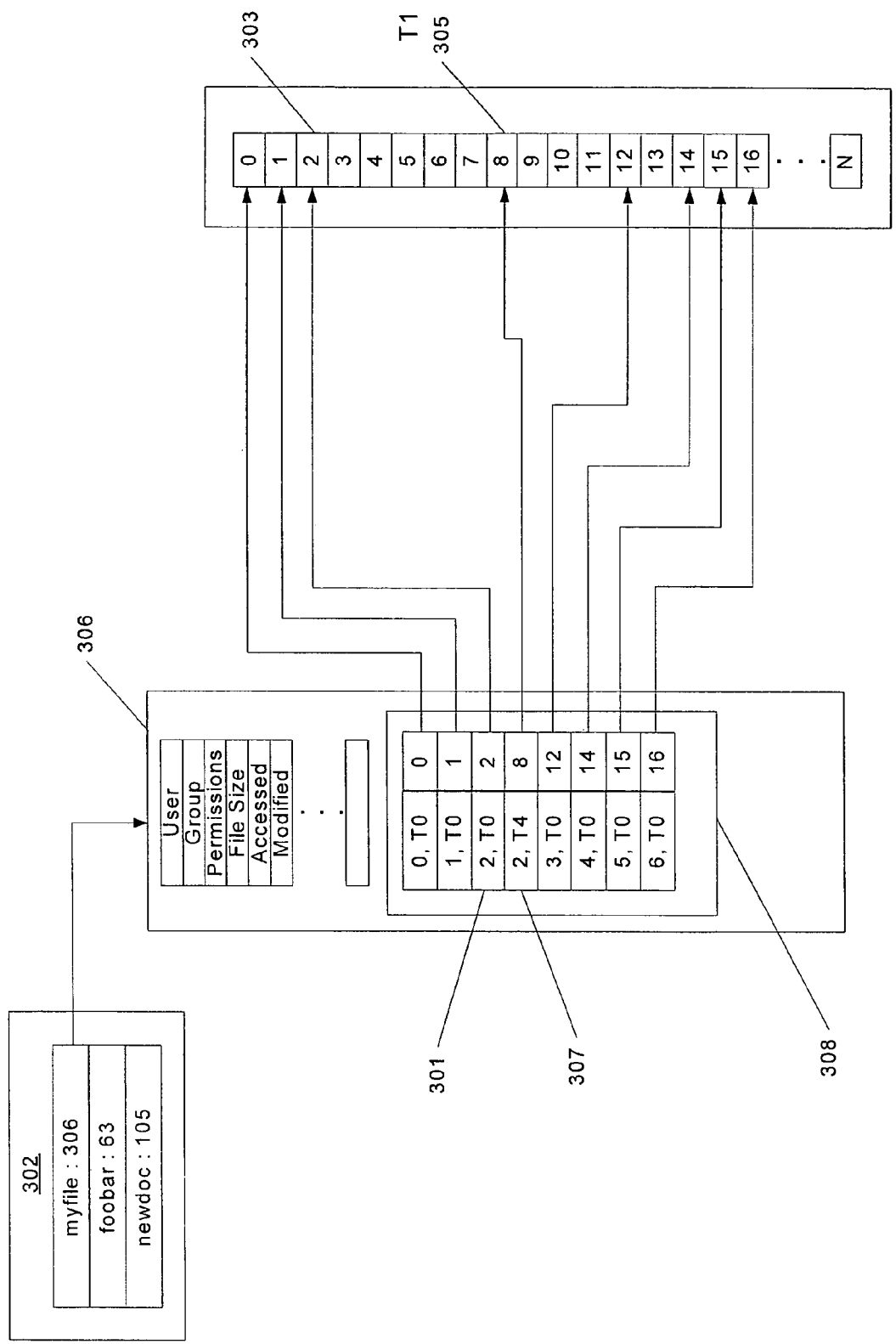
FIG. 3B depicts one embodiment of a portion of a time indexed block based allocation file system.

FIG. 3B illustrates an example corresponding to FIG. 3A wherein the data corresponding to offset "2" has been modified. In this example, the data corresponding to offset "2" was modified at a time "T4". However, the block map entry corresponding to offset "2" is not simply replaced. Rather, the original entry 301 is retained in the block map. The modified version of the data corresponding to offset "2" (referenced as 303 on the storage media in this example) corresponding to offset "2" is written to a new block "8" (referenced as 305 on the storage media). A new block map entry 307 is then created for the new version of the modified data. As can be seen, the key for the new entry 307 includes the same offset "2" as the original entry. However, the time stamp "T4" reflects a time corresponding to the revised version of the data. Therefore, the block map 308 identifies not only the original data corresponding to offset "2", but the revised data as well. In this manner, the block map 308 itself may be configured to identify multiple versions of data blocks, and the file itself. Accordingly, by referencing both the offset and time stamp, multiple versions of a file may be retained and accessed.

In various embodiments, different approaches may be utilized in managing new block map entries and the corresponding data. In one embodiment, the approach generally includes (i) allocating a new block each time a file is written to, (ii) writing the new data to the newly allocated block, and (iii) inserting a new tuple in the block map for the new block. This approach is generally depicted by FIG. 3B wherein the new data is written to the newly allocated block 305, and the original data remains in its originally allocated block 303.

Figure 3C:
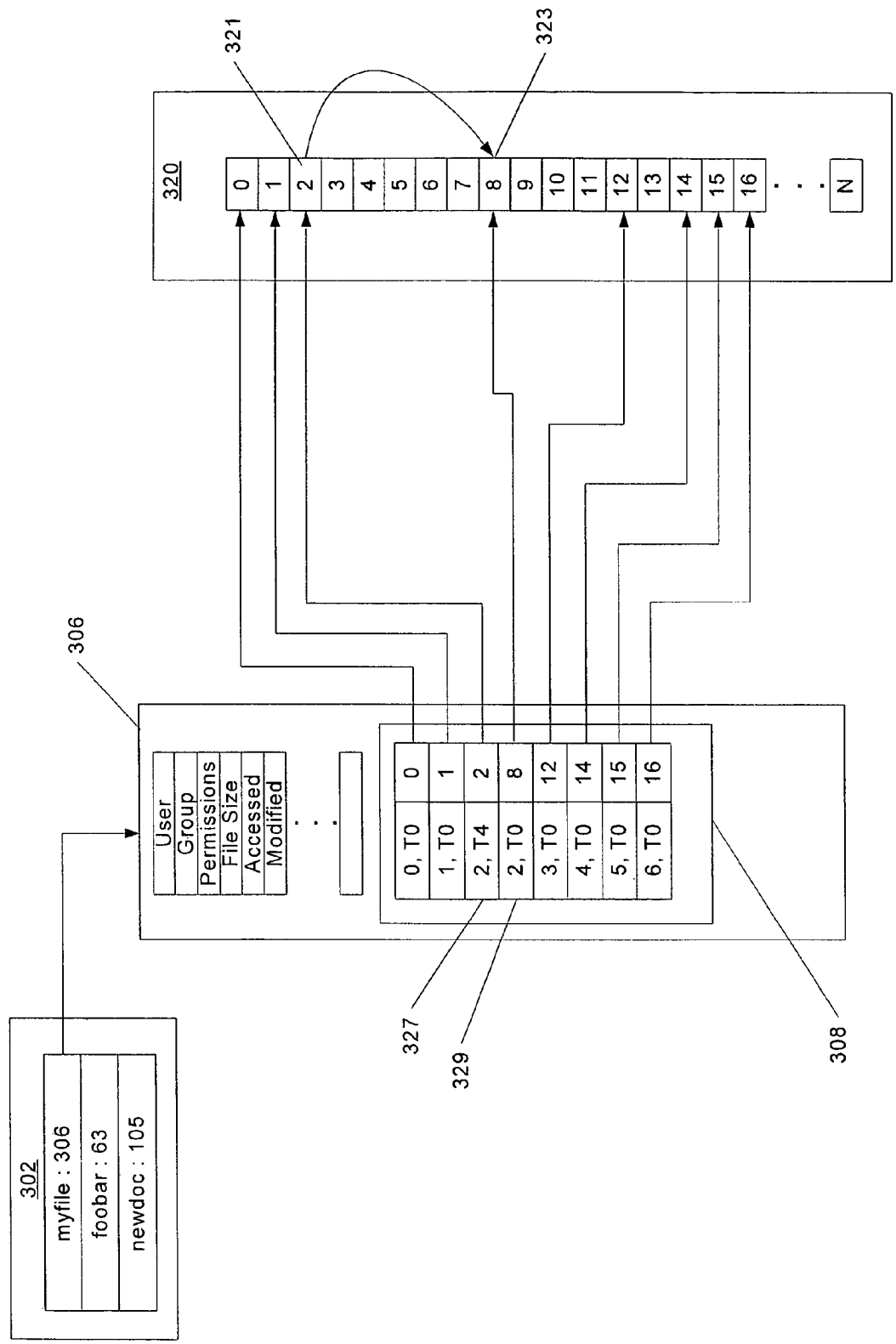
FIG. 3C depicts one embodiment of a portion of a time indexed block based allocation file system.

FIG. 3C depicts an alternative approach for managing entries and data in the file system. As in FIG. 3B, a directory 302, inode 306, and storage media 320 are depicted. Inode 306 includes a block map 308. Also, as in FIG. 3B, a write to offset "2" occurred at time "T4". In the approach depicted by FIG. 3C, (i) a new block 323 is allocated in response to the write to the block; (ii) the original data corresponding to offset "2" is copied from its original location 321 to the newly allocated block 323; (iii) the new data is written to the original location 321 corresponding to offset "2", and the original entry 327 is updated to reflect the time "T4" for the new data; and (iv) a new entry 329 is created in the block map 308 which identifies the new location 323 for the previous data corresponding to offset "2". Using this second approach, the current version of a file may generally be kept in its originally allocated blocks, which may in turn correspond to a more contiguous sequence of blocks than would be the case were the approach of FIG. 3B followed. However, it is also noted that this latter approach also requires copying data between locations in the file system. The particular approach utilized in a given case may depend upon a variety of factors. However, numerous such approaches are possible and are contemplated.

Figure 3D:
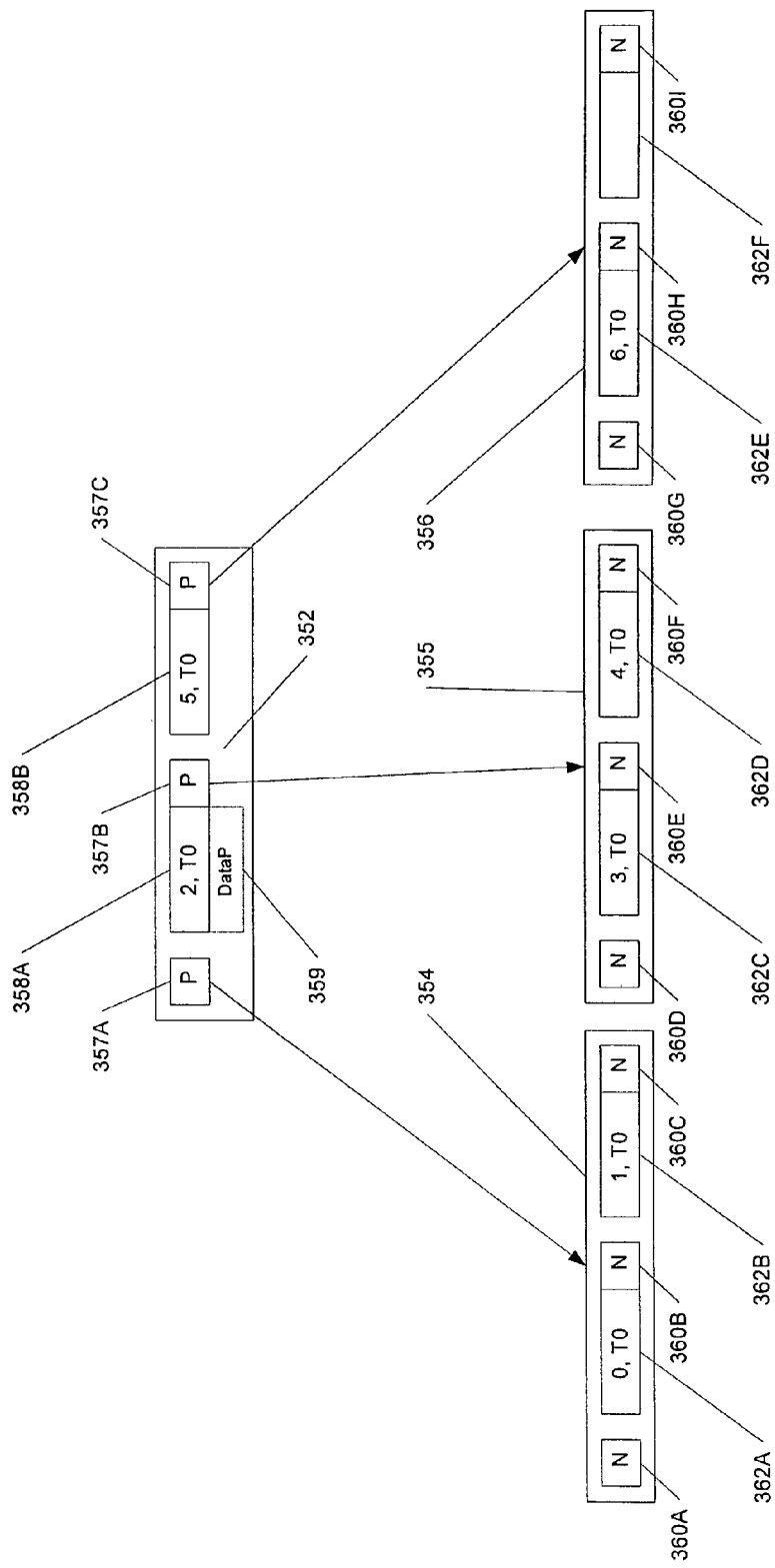
FIG. 3D depicts one embodiment of a time indexed block map stored in a B-tree.

In the example's of FIG. 3B and FIG. 3C, the block map 308 is generally depicted as a simple list or array. However, those skilled in the art will appreciate that block maps may generally be larger and more complex than illustrated in FIG. 3B and FIG. 3B. Consequently, maintaining such block maps as simple lists or arrays may not be efficient. Therefore, alternative data structures may be utilized for maintaining the block maps. FIG. 3D depicts one embodiment in which the time indexed block map is maintained in a B-tree. As is well known, a B-tree is a multiway tree (in contrast to a binary tree). Each node of a B-tree may include a large number of keys. As the number of keys in a given node may be large, the number of subtrees of each node may also be large. Consequently, the height of a B-tree may be kept relatively small and searches may be performed in a relatively quick manner. It is noted that while B-trees are used for purposes of discussion herein, other data structures are possible and are contemplated as well. For example, any ordered index—including search trees, arrays, linked lists, and so on, may be utilized in conjunction with the methods and mechanisms described herein.

In FIG. 3D, one embodiment of a B-tree corresponding to the block map 308 of FIG. 3A is depicted. In this example, the B-tree includes four nodes—a root node 352, and nodes 354, 355, and 356. For ease of illustration, each node is configured to store only two keys. However, those skilled in the art will appreciate the nodes may be configured to store many more keys than depicted. Node 352 is shown to include keys 358A-358B, node 354 includes keys 362A-362B, node 355 includes keys 362C-362D, and node 356 includes keys 362E and 362F. Keys within the nodes generally correspond to the keys illustrated in FIG. 3A. Therefore, each key includes both an offset and timestamp. For example, key 358A includes offset="2" and timestamp="T0". Each node further includes child node pointers for identifying subtrees. Root node 352 includes pointers 357A-357C, and each of child nodes 354-356 also includes three pointers, including pointers 360A-360I. As none of the child nodes 354-356 has an children, all of pointers 360A-360I may be null (indicated as "N") in FIG. 3D. In contrast, each pointer 357A-357C of root node 352 includes an identifier (or pointer "P") which identifies a child node. It is to be understood that other types of information may be maintained within each of the nodes than is shown in FIG. 3D. For example, associated with each key may be an identifier which identifies a location of the corresponding data. For example, associated with key 358A is a data pointer (DataP) 359 which identifies the location of the data which corresponds to key 358A. In general, each key will have associated data which identifies the location of the corresponding data. However, for ease of illustration, the additional data such as DataP 359 will not generally be shown. In addition to the above, pointers identifying a parent node may be maintained to facilitate traversal, and so on.

In the embodiment of FIG. 3D, both the offset and timestamp of a key are used for indexing and traversing the tree. Accordingly, pointer 357A may be used to identify keys with a value less than (or less than or equal to depending upon the implementation) that of key 358A. In addition, pointer 357A may also be used to identify keys with a same offset as key 358A, but an earlier timestamp. Therefore, not only may the tree be traversed to locate data corresponding to particular file offsets, but particular versions of such data may be identified as well. In FIG. 3D, the root node includes keys corresponding to offsets "2" and "5". For time T0, offsets less than "2

(i.e., offsets "0" and "1") are found in the leftmost node 354. Offsets greater than or equal to "2", but less than "5" are found in node 355. Finally, offsets greater than or equal to "5" are found in node 356. Key 362F is unused in this example. As the tree in FIG. 3D corresponds to the block map of FIG. 3A which generally represents a single version of the corresponding file, no duplicate offsets are found in the tree.

Figure 3E:
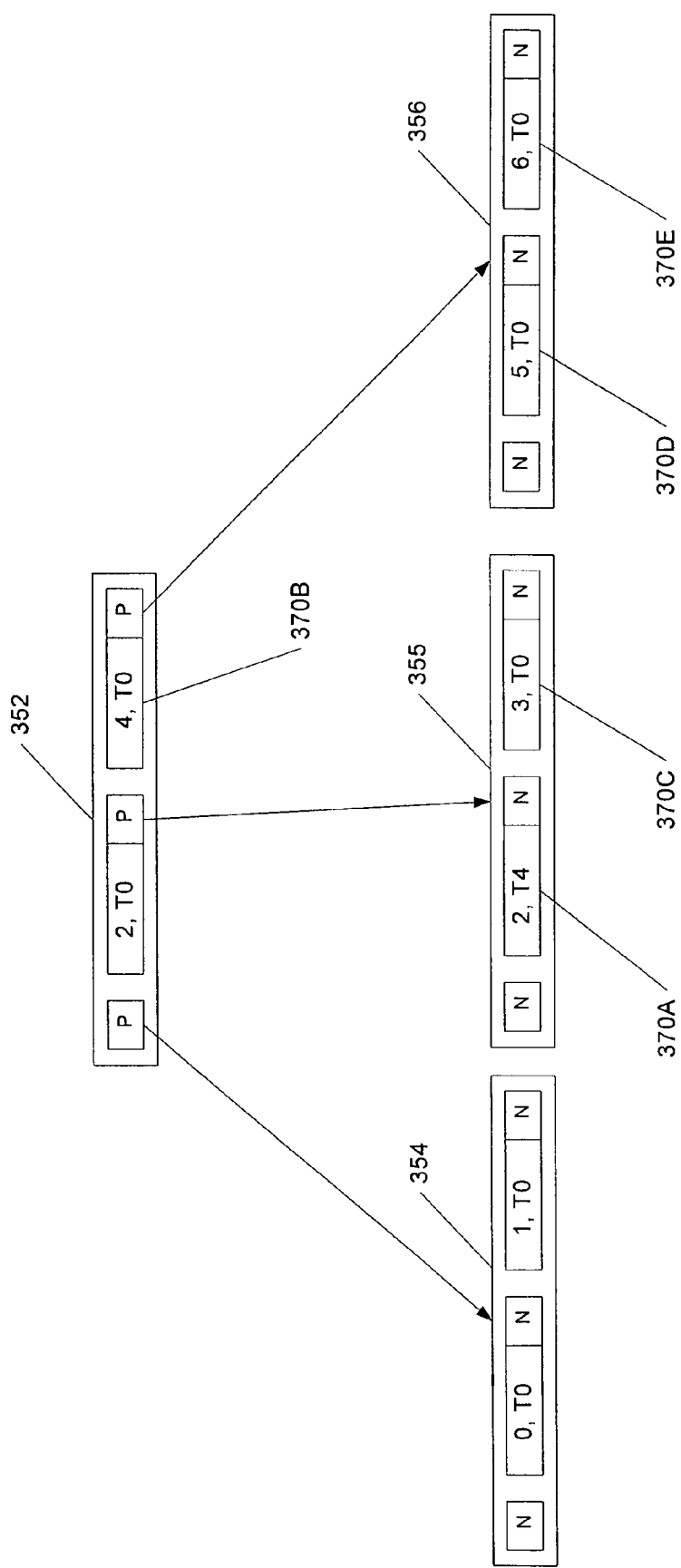
FIG. 3E depicts one embodiment of a time indexed block map stored in a B-tree.

FIG. 3E illustrates a tree corresponding to the block map 308 of FIG. 3B which does include multiple versions. In this example, multiple versions of the data corresponding to offset "2" are present. The original version with timestamp "T0" is represented in node 352. The newer version with timestamp "T4" has the same offset "2". However, because it has a later timestamp ("T4">"T0"), the corresponding key 370A (2, T4) is indexed as being greater than the key (2, T0) and is stored in node 355. Assuming the tree in FIG. 3E represents an update of the tree in FIG. 3D, the insertion of the new key 370A requires a rotation or other manipulation of data within the tree. There are many algorithms extant as to how insertions and deletions may be performed on B-trees. All such alternatives are contemplated. In one embodiment, keys corresponding to more recent versions of data may be stored higher in the tree. In this manner, processes reading a most current version of a file may have reduced latency. In the example of FIG. 3E, the key originally occupying the position now occupied by key 370A was moved to position 370C. The key previously in position 370C was moved up to position 370B. The key previously in position 370B was moved down to position 370D. Finally, the key previously in position 370D was moved to position 370E.

In this example, the ordering rules are seen to be that a child node to the left of a key identifies keys less than the corresponding key, and the pointer to the immediate right of a key identifies keys which are greater than or equal to the corresponding key. Therefore, because key (2, T4) is indexed as being greater than key (2, T0), key (2, T4) is found in a node 355 to the right of the key (2, T0). In other embodiments, keys corresponding to more recent versions of data may be stored higher in the tree. In this manner, processes reading a most current version of a file may have reduced latency.

Figure 4A:
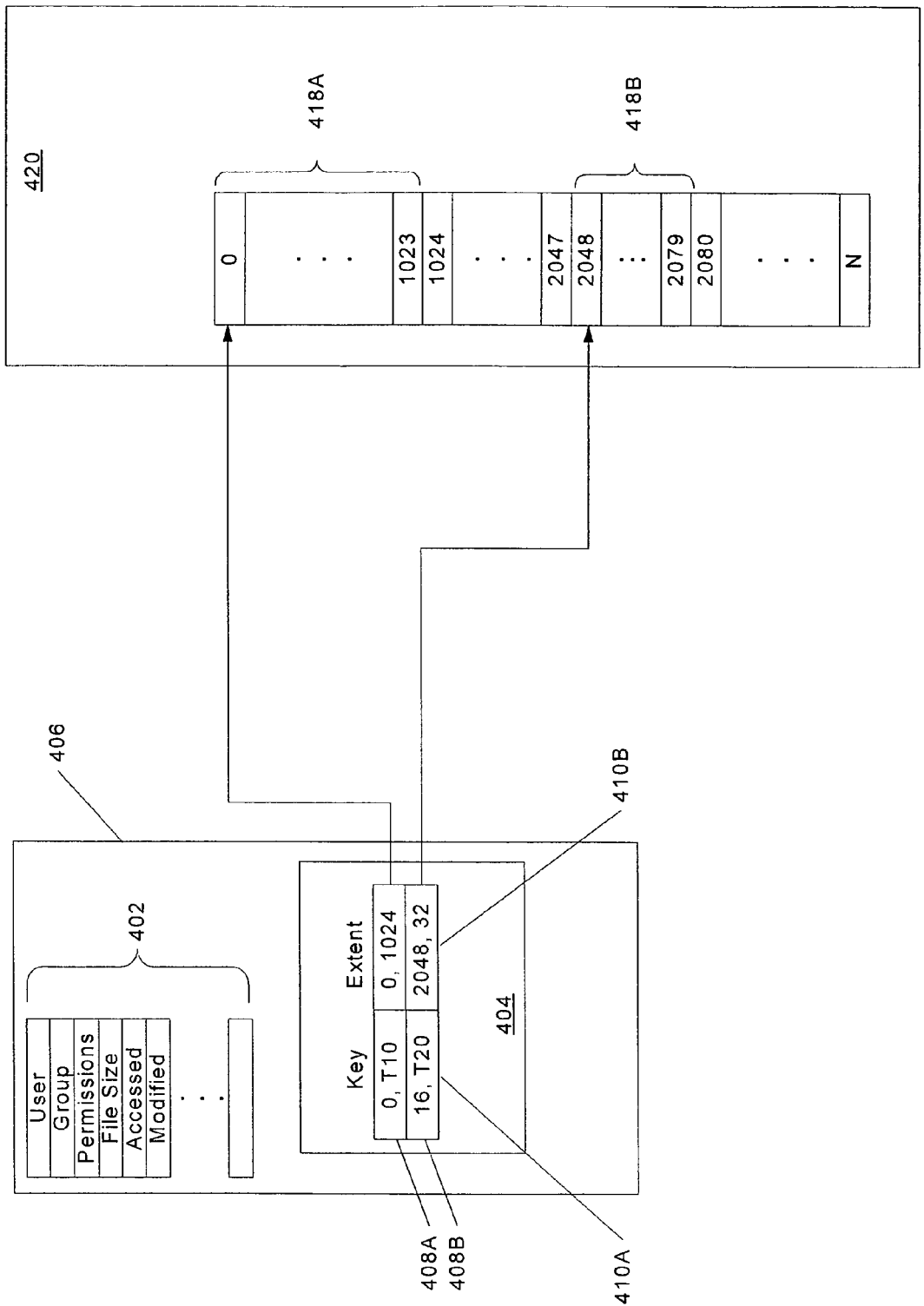
FIG. 4A depicts one embodiment of a portion of a time indexed extent based allocation file system.

In the foregoing examples, embodiments corresponding to block-based allocation systems have been depicted. Turning now to FIGS. 4A-4F, embodiments corresponding to extent-based allocation systems are provided. FIG. 4A illustrates an embodiment of a portion of a file system utilizing a time-indexed extent-based allocation block map. FIG. 4A shows an inode 406 and storage medium 420. Inode 406 includes a variety of attributes 402 and an extent map 404. In this embodiment, the extent map 404 includes entries 408A-408B which include a key (column 410A) and a corresponding extent (column 410B). As before, storage medium 420 includes a plurality of blocks 0-N allocable for storage.

Block map 404 illustrates one embodiment in which multiple versions of file data may be identified. A first entry 408A includes a key (0, T10) and corresponding extent (0, 1024). Similar to the block-based allocation approach, the key (0, T10) represents both an offset and time stamp. The corresponding extent (0, 1024) identifies a sequence of blocks beginning with block "0" and having a length of 1024. Therefore, blocks 0-1023 418A correspond to the key (0, T10). Also shown is a second entry 408B which corresponds to a write occurring at time "T20". The write affected the blocks beginning at offset 16 and having a length of 32. In other words, the data corresponding to blocks 16-47 418B were affected by the write. Therefore, a new extent was allocated for the 32 blocks and the new data written to the newly allocated extent. In this case, the new extent begins at block 2048 and has a length of 32 (i.e., blocks 2048-2079).

Utilizing the block map 404, the most recent data corresponding to offset 16 may be quickly found due to the new entry 408B. However, the earlier version of the data corresponding to offset 16 is not so readily available. In contrast to entry 408B, entry 408A only generally identifies the region of data which includes the desired version. Consequently, retrieval of various versions of particular data may have differing latencies. Accordingly, a different approach may be adopted which may facilitate more rapid identification and retrieval of different versions of particular data.

Figure 4B:
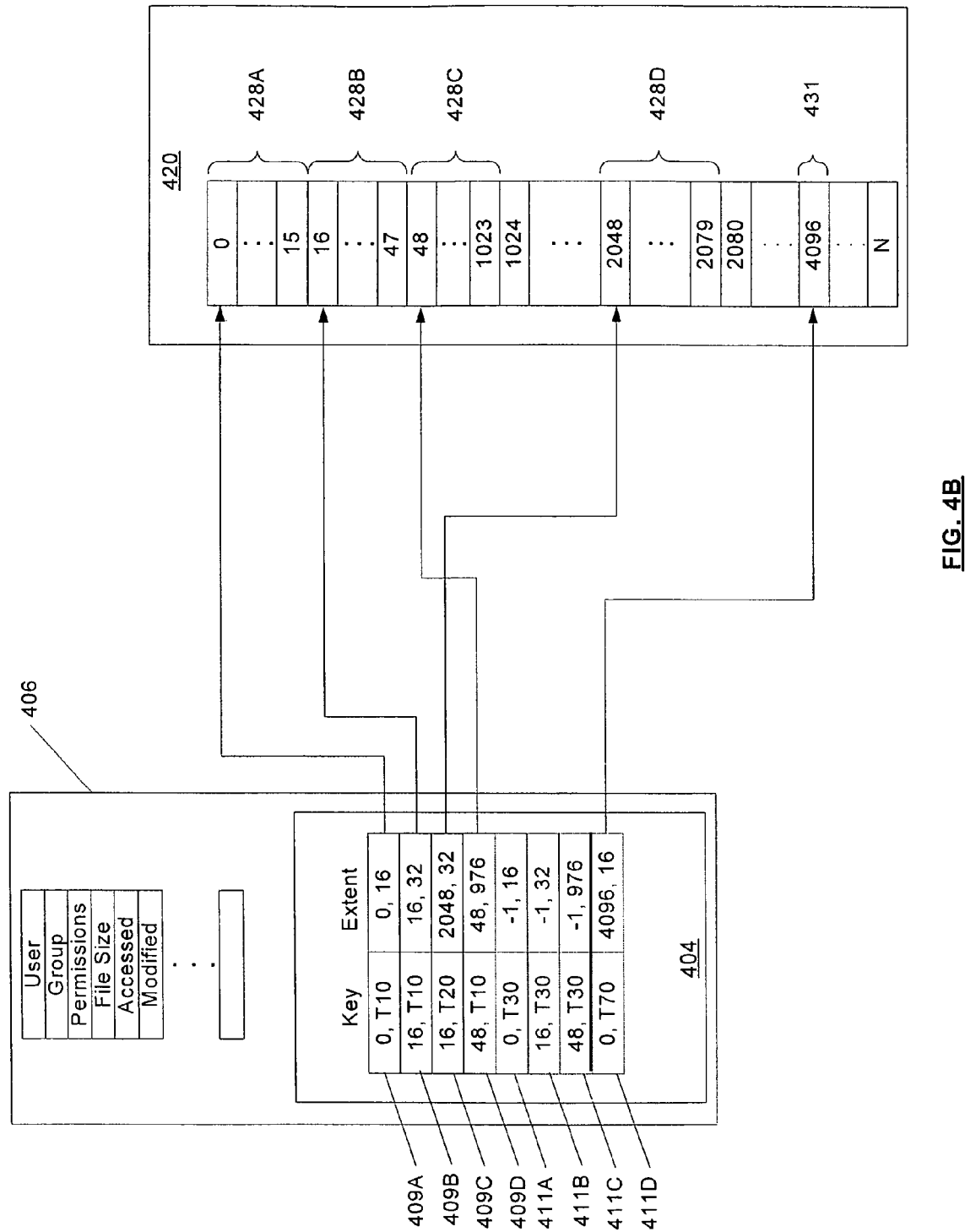
FIG. 4B depicts one embodiment of a portion of a time indexed extent based allocation file system.

FIG. 4B illustrates an embodiment wherein existing extents are split in response to detected writes. FIG. 4B depicts inode 406 with block map 404, and storage 420. Generally speaking, in the embodiment of FIG. 4B, a write to an existing extent may result in the existing extent being split at both the beginning and ending boundaries of the write. Splits may be rounded to a block boundary as appropriate. Therefore, assume the same scenario as depicted in FIG. 4A. The original entry 408A as shown in FIG. 4A has key (0, T10) and extent (0, 1024). Subsequently, a write to offset 16-47 occurs. However, rather than the approach of FIG. 4A, FIG. 4B shows the original extent (418A in FIG. 4A) is split into multiple extents (428A-428C in FIG. 4B). In particular, a new extent is created which corresponds to the original data to which the write is directed. In this case, a subsequent write to blocks 16-47 is detected at time "T20". Therefore, a new extent (16, 32) is created which splits the original extent (0, 1024). Consequently, the extents (0, 16), (16, 32), and (48, 976) result. In this embodiment, a new extent (2048, 32) is allocated for the write and the new data is written to the new blocks 2048-2079. Splitting extents in this manner may allow a strict order to be maintained among the keys, which in turn may facilitate efficient searches.

Due to the creation of the new extent for the write data, and the two new extents that result from splitting the original extent, a total of three new extents are created. Accordingly, three new entries are added to the block map 404. Similar to the example of FIG. 4A, a new entry 409C is created which corresponds to the extent created for storing the new write data. An entry 409B is created which corresponds to the original data to which the write was directed. Therefore, the entry 409B has a key (16, T10) and extent (16, 32). As the original extent was split, its entry 409A is updated to reflect this fact. Accordingly, this entry retains the key (0, T10), but has an extent shortened to (0, 16). Finally, an entry 409D is created for the remainder of the original extent resulting from the split. Accordingly, entry 409D has a key with offset of 48 and length of 976. Utilizing the approach of FIG. 4B, the various versions of data, including the original data, may be readily identified.

In addition to the above, various embodiments may include the ability to represent the truncation of a file at a given point in time. For example, referring again to FIG. 4B, the block map 404 includes entries which indicate the file was truncated at a time T30. Entries 411A-411C show the corresponding file was truncated to file size of zero at time T30. Accordingly, a block map entry is shown for each extent of the file. The first entry 411A has a key (0, T30), the second entry 411B has a key (16, T30), and the third entry 411C has a key (48, T30). The identified extent for each of these entries includes a special identifier which indicates truncation for the extent. In the example shown, a "−1" is used to indicate truncation. However, any suitable identifier may be utilized. The extent for each entry identifies the corresponding length of the extent to which the truncation refers. Therefore, entry 411A has an extent of (−1, 16), entry 411B has an extent of (−1, 32), and entry 411C has an extent of (−1, 976). Utilizing such an approach, it may be determined that the file was truncated at time T30. A further entry 411D is also shown which indicates that a write to offset 0 with length 16 occurred at time T70. Therefore, a portion of the previously truncated file may be seen to have been "repopulated" with data at a later time.

Figure 4C:
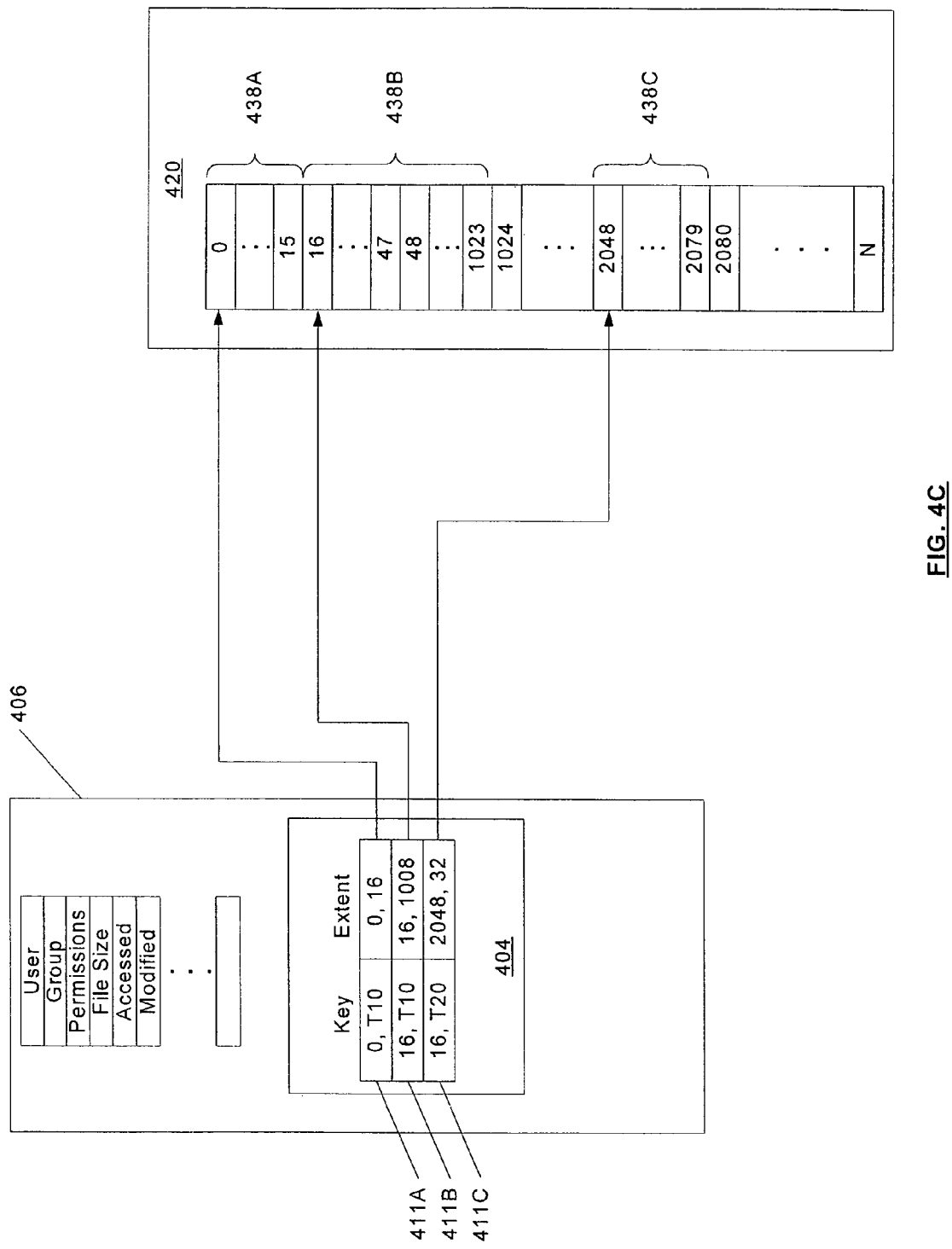
FIG. 4C depicts one embodiment of a portion of a time indexed extent based allocation file system.

As an alternative to the approach of FIG. 4B, an original extent to which a write is directed may be split at only the starting block (as opposed to both the beginning and end of the write). FIG. 4C illustrates an example which uses this approach. As with FIG. 4B, it is assumed the block map 404 included an entry with key (0, T10) and corresponding extent (0, 1024). Subsequently, at time "T20", a write to blocks 16-47 occurred. As before, a new extent is allocated for the new write and a new entry created. Therefore, an entry 411C is created with key (16, T20) and new extent (2048, 32) shown as blocks 438C. In the previous example of FIG. 4B, the original extent (0, 1024) was split at both the beginning block of the write (16) and the ending block of the write (48). However, in this approach a split is only created at the beginning block (16). Consequently, two block map entries are used to represent the data corresponding to the original extent. The first entry 411A has a key of (0, T10) and extent (0, 16) shown as blocks 438A. The second entry corresponds to the beginning of the write, and has a key of (16, T10) and extent (16, 1008) shown as blocks 438B. Therefore, the two versions of the data for blocks 16-47 are readily identifiable via entries 411B and 411C. The first has a timestamp of "T10" and the second has a timestamp of "T20".

It is noted that while the examples in FIG. 4B and FIG. 4C store the new write data in newly allocated extents, alternative embodiments may utilize the previously discussed approach wherein the original data is copied to the new extent and the new write data is stored in the blocks previously occupied by the copied data. Numerous such alternatives are possible and are contemplated.

Figure 4D:
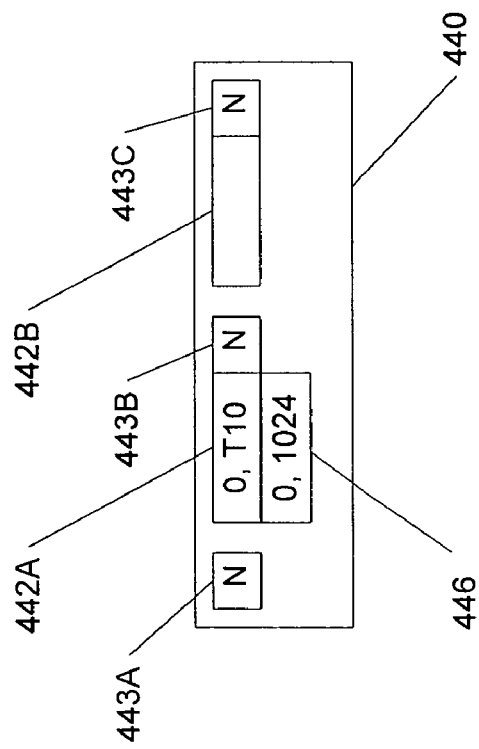
FIG. 4D depicts one embodiment of a time indexed block map stored in a B-tree.
Figure 4E:
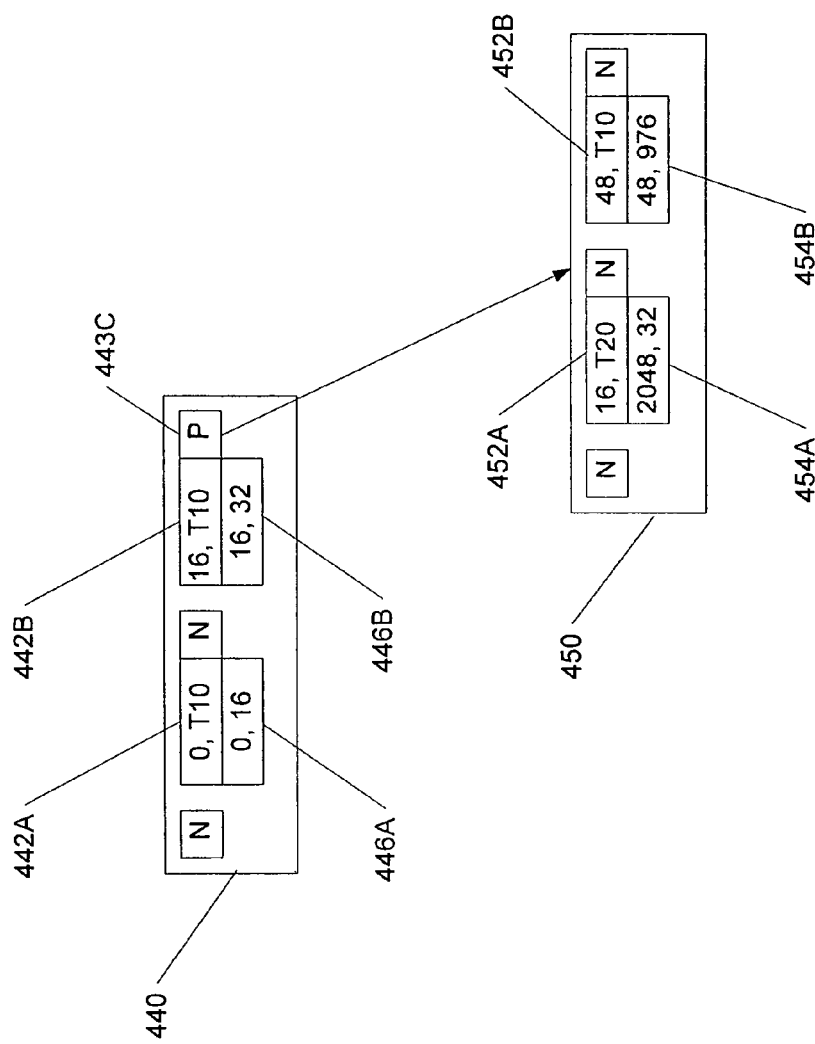
FIG. 4E depicts one embodiment of a time indexed block map stored in a B-tree.

Turning now to FIGS. 4D-4F, embodiments depicting the storage of extent-based allocation block map data in a B-tree are provided. FIG. 4D depicts a tree including a single block map entry. A single node 440 is shown to include two keys 442A-442B, and three child node pointers 443A-443C. Also shown in this example is an extent 446 which corresponds to the key 442A. As in the examples above, the original entry includes a key (0, T10) 442A and corresponding extent (0, 1024) 446. No other entries are stored for this example. The following two figures describe the alternative approaches of (i) splitting an extent at both the beginning and ending block of a write, and (ii) splitting an extent at only the beginning block of a write.

FIG. 4E illustrates a B-tree storing block map data where the extent has been split at both the beginning and end of a write. In particular, the tree of FIG. 4E generally represents the block map data shown in FIG. 4B. As previously discussed, an original extent is created at offset 0 time T10 as (0, 1024) and a subsequent write is performed to block offsets 16-47. The original extent is split at both the beginning (16) and end (48) of the write. Block map entries for the now split original extent are created, and a new extent is allocated for the new data. A new block map entry is created for the new extent. In FIG. 4E, key 442B stores the key (16, T10) and has corresponding extent 446B of (16, 32). A new node 450 is created, and the pointer 443C is updated to identify the new node 450. In the new node 450, the leftmost key 452A stores the key (16, T20) and has corresponding extent 454A of (2048, 32). The rightmost key 452B stores the key (48, T10) and has corresponding extent 454B of (48, 976). Therefore, if the latest version of the data corresponding to blocks 16-47 were desired, it may be immediately determined that the corresponding entry is either entry 442B or is in the subtree identified by pointer 443C.

Of course, as already mentioned above, the insertion and manipulation of the data in the tree may take other forms. For example, the key (16, T20) could have been stored in key location 442B. In such a case, the key (16, T10) may then be stored in a child node to the immediate left of key 442B. Still further, other alternatives are possible as well. For example, while the above examples organize keys within the tree in an offset-major: timestamp-minor order, other embodiments may be organized in a timestamp-major: offset-minor order. In such a case, the timestamp would be first used to order the keys. Therefore, a key with a greater offset may be found to the left of another key, if the key with the greater offset has an earlier timestamp. Other alternatives may reverse the order in which keys are arranged. For example, keys may be arranged such that later timestamps corresponds to the left of a given timestamp, and earlier timestamps correspond to the right of a given timestamp. All such alternatives are contemplated.

FIG. 4F depicts an embodiment wherein the original extent is split only at the beginning block of a write. The tree in FIG. 4F generally represents the block map data as shown in FIG. 4C. In this case, the tree generally resembles the tree of FIG. 4E, with the exception that the key (48, T10) and corresponding extent (48, 976) were not created and are not stored. Also, the extent 446B (16, 1008) in FIG. 4F is shown to encompass the remainder of the original extent.

Figure 5:
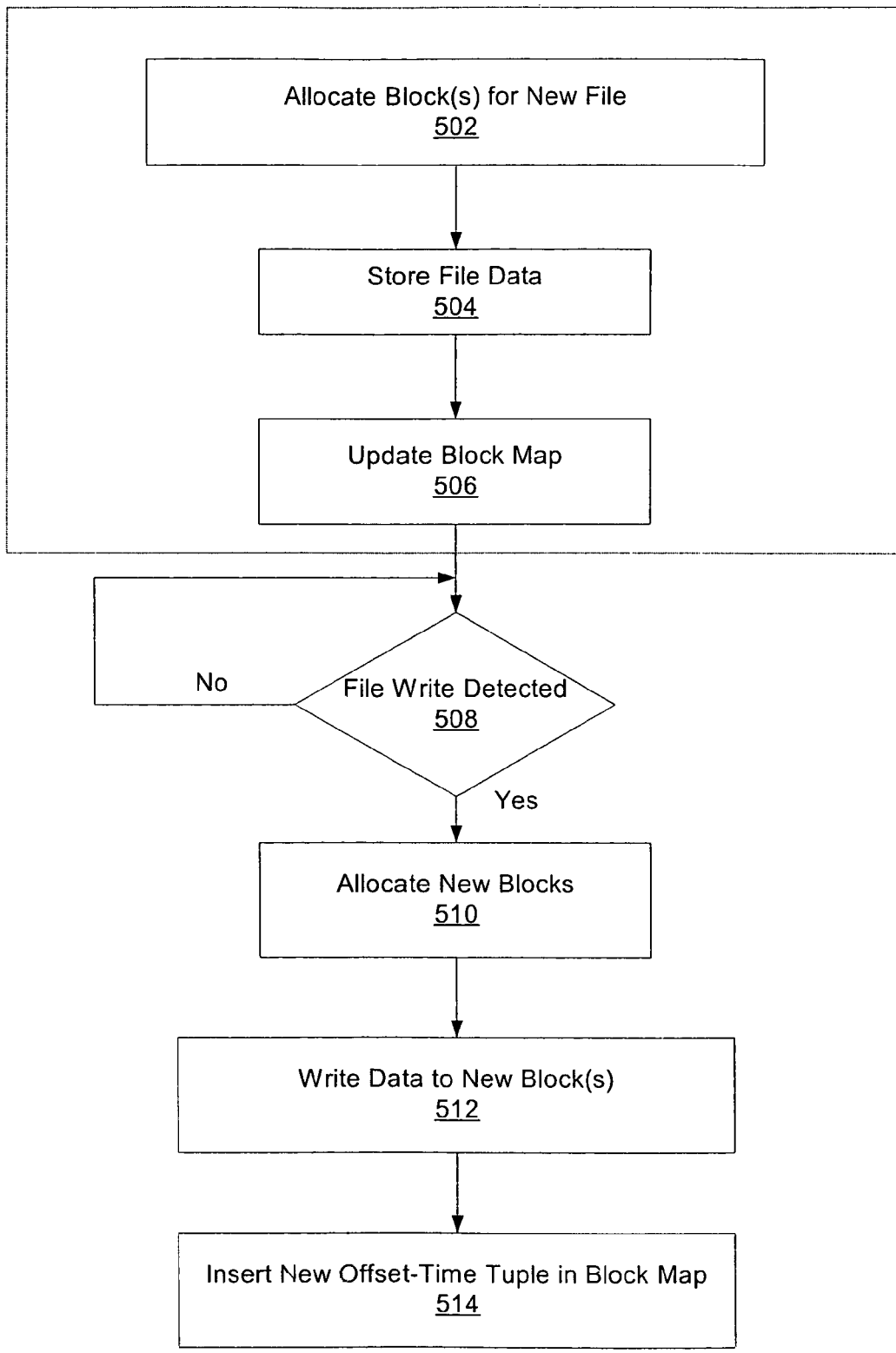
FIG. 5 depicts one embodiment of a method for managing a time indexed block map in a file system utilizing block based allocation.

Turning now to FIG. 5, one embodiment of a method for managing time-indexed block map data in a system using block-based allocation is shown. Upon creation of a file, blocks are allocated for storing the data (block 502) and the data is stored in the allocated blocks (block 504). The corresponding block map (e.g., as contained in an inode or other structure corresponding to the file) is then updated (block 506) to identify the blocks allocated for the file. In addition to identifying the blocks allocated for the file, the block map further includes a timestamp which identifies a time when the file was created or the data stored. As an alternative to blocks 502, 504, and 506, upon creation of a file an inode may be created and an empty block created. Various approaches to file creation are possible and are contemplated. Further, the order of events may be different than that depicted in FIG. 5.

Subsequently, responsive to a write to the file (decision block 508), new blocks are allocated for storing the write data (block 510) and the write data is stored in the newly allocated blocks (block 512). Finally, the block map is updated to reflect the new version of the data (block 514). As described above, this update will generally include the creation of a new entry to accommodate the addition of the revised data. This new entry will generally include a tuple/key identifying the offset corresponding to the write and a timestamp for the write. This key may then identify the newly allocated blocks. It is noted that while the term "timestamp" is used herein, the timestamp need not reflect an actual time corresponding to the data. While a timestamp which does reflect an actual time and/or date may be desirable in certain embodiments, other embodiments may simply use timestamp indicators to reflect times which are relative to one another. Therefore, while (as a simple example) one embodiment may use two successive timestamps which reflect actual times and dates, such as 1:00 pm on Jan. 1, 2005, and 1:01 pm on Jan. 1, 2005, an alternative embodiment may simply identify these two timestamps as "1" and "2" to indicate the second occurred after the first.

Figure 6:
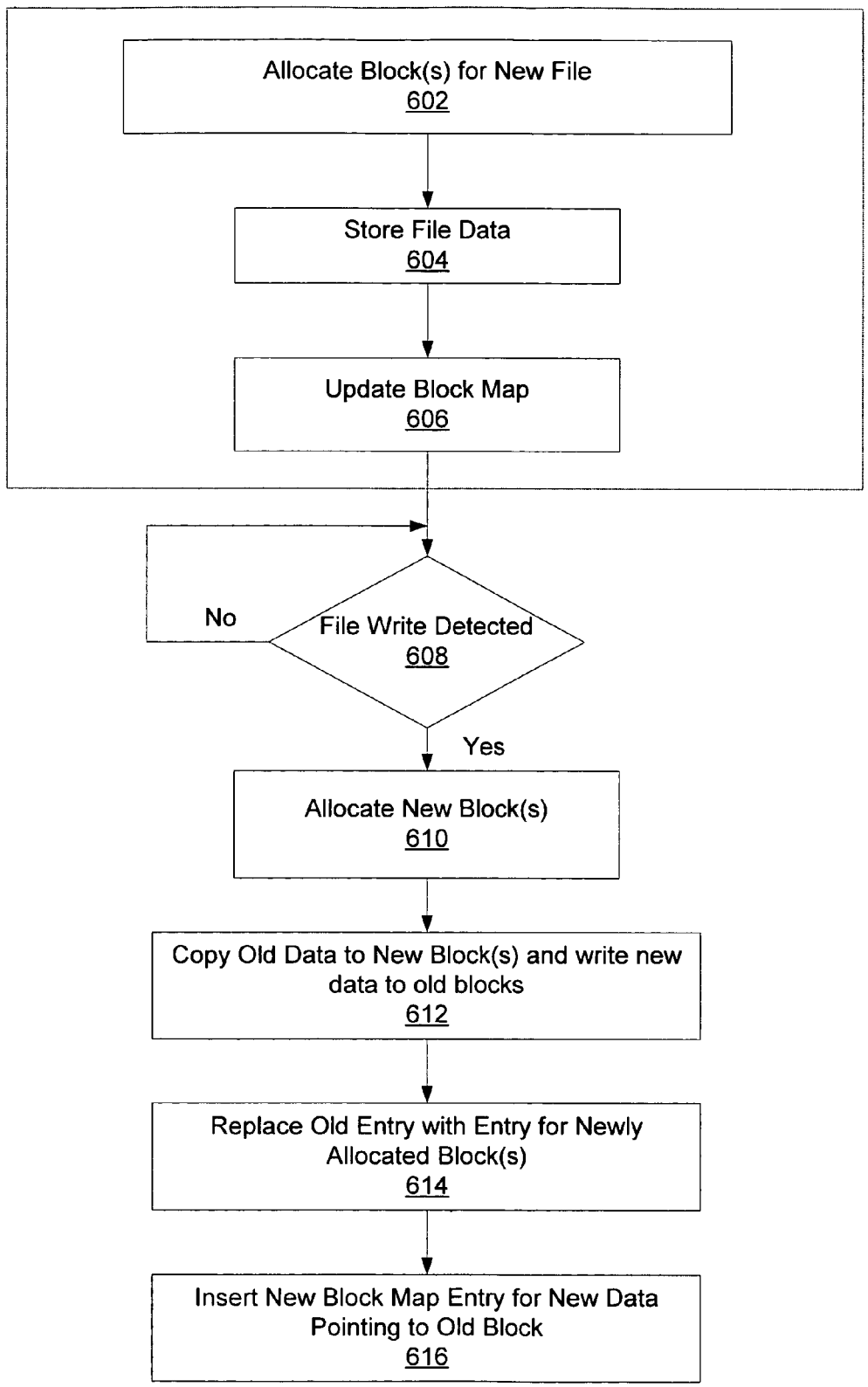
FIG. 6 depicts one embodiment of a method for managing a time indexed block map in a file system utilizing block based allocation.

FIG. 6 depicts an alternative embodiment in which the original data is copied to the newly allocated blocks. Similar to FIG. 5, upon creation of a file, an inode may be created and an empty block created. Responsive to receiving write data, blocks are allocated for the data (block 602), the data is stored (block 604), and the block map is updated (block 606). As with blocks 502, 504, and 506 in FIG. 5, alternative approaches to blocks 602, 604, and 606, are possible and are contemplated. Responsive to a write (decision block 608), new blocks are allocated (block 610). In this embodiment, any existing old data (i.e., the original data being modified by the write) is copied to the newly allocated blocks (block 612) and the new data is written to the blocks vacated by the affected data. If no old data exists, then previously allocated blocks may be used to store the new data. The block map entry which was used to identify the affected data is now updated to reflect the new data (e.g., by updating the timestamp) (block 614). Finally, a new block map entry is created which identifies the original data and its new location(s). As may be appreciated, the ordering of events as depicted in FIG. 6 (and FIG. 5 and FIG. 7 as well) is for illustrative purposes only. In other embodiments, event ordering may be otherwise, and some events may occur concurrently. In some embodiments, blocks may be allocated when a file is created. In such a case, write data may not cause new allocations. Numerous such alternatives are possible and are contemplated.

Figure 7:
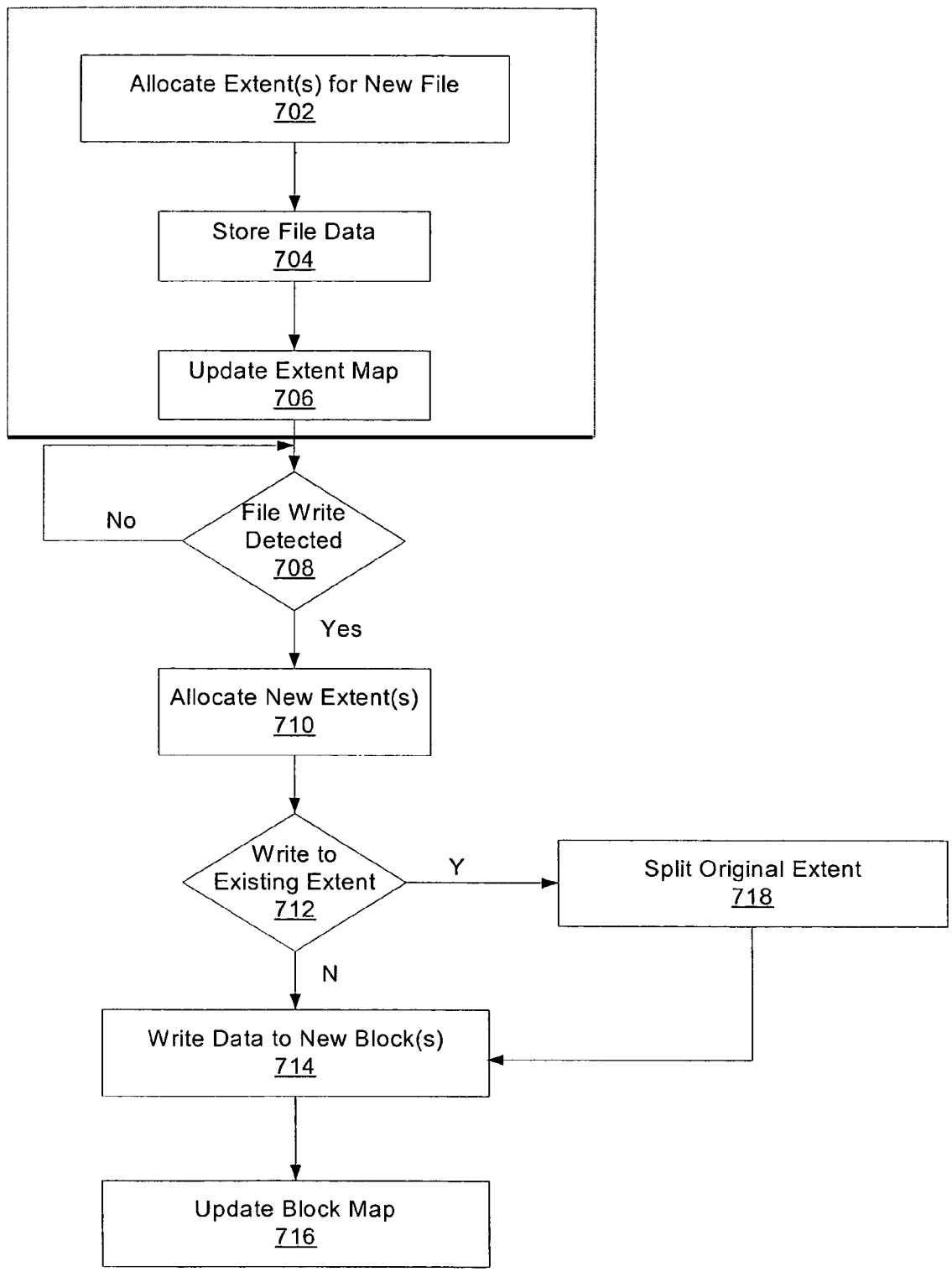
FIG. 7 depicts one embodiment of a method for managing a time indexed block map in a file system utilizing extent based allocation.

FIG. 7 illustrates one embodiment of a method for managing time-indexed block map data in a system using extent-based allocation. Upon creation of a file, extent(s) are allocated (block 702), the file data is stored within the extent (704), and the corresponding block map is updated (block 706). As with blocks 502, 504, and 506 in FIG. 5, alternative approaches to blocks 702, 704, and 706, are possible and are contemplated. As the embodiment utilizes time-indexed block maps, an entry in the block map not only identifies the newly allocated extent(s), but also includes a timestamp for the file data. Subsequently, in response to a write (decision block 708), a new extent(s) is allocated (block 710). In the event the write is directed to data within an existing extent (decision 712), the original extent is split (block 718), the new data is written to the new extent, and the block map is updated as described previously (block 716). On the other hand, if the write does not affect preexisting data (e.g., data is being appended), the new data is written to the newly allocated extent(s) (block 714), and the block map is updated (block 716).

It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Numerous variations and modifications will become apparent to those skilled in the art once the above disclosure is fully appreciated. It is intended that the following claims be interpreted to embrace all such variations and modifications.

What is claimed is:

1. A method for managing data in a file system, the method comprising:
   allocating by a computing device one or more blocks for use in storing data corresponding to a file;
   storing the file data in the blocks;
   updating an inode corresponding to the file responsive to said allocating, the inode including attributes and an extent map corresponding to the file, the inode being configured to simultaneously identify multiple versions of the file corresponding to multiple points in time, wherein the update includes adding data to the inode which identifies the one or more blocks;
   in response to detecting a write to the file, subsequent to said updating, is directed to particular blocks of the one or more blocks:
   allocating one or more new blocks for use in storing data which corresponds to the file;
   creating a new entry in the extent map of the inode which identifies the new blocks, said new entry being simultaneously maintained along with entries of the one or more entries in the extent map;
   updating a first entry of the extent map to identify the particular blocks to which the write was directed and a time at which the write occurred;
   wherein said extent map simultaneously maintains entries for multiple updates which have been made to the file at multiple points in time, and wherein each entry of the extent map includes a key comprising an offset to corresponding data within the file and a timestamp associated with a time of an update of a corresponding extent map entry;
   in response to detecting the write corresponds to one or more blocks of an original extent:
   splitting the original extent at a first block corresponding to the beginning of the write; and
   splitting the original extent at a last block corresponding to the end of the write.

2. The method as recited in claim 1, wherein the file system does not store multiple copies of a given block for a particular file which are common to multiple versions of the particular file.

3. The method as recited in claim 2, wherein the first entry is the new entry, and wherein the method further comprises storing data corresponding to the write in the new blocks.

4. The method as recited in claim 2, wherein the first entry is an entry corresponding to at least one of the particular blocks, and wherein the method further comprises:
   copying the data from the particular blocks to the new blocks;
   storing data corresponding to the write in the particular blocks; and
   updating the new entry to identify at least one of the new blocks, and include an original timestamp corresponding to the data stored in a corresponding block.

5. The method as recited in claim 1, wherein the first entry is the new entry and the new blocks comprise a new extent, and wherein the method further comprises storing data corresponding to the write in the new extent.

6. The method as recited in claim 1, wherein the new blocks comprise a new extent and the first entry is an entry corresponding to at least one of the particular blocks, and wherein the method further comprises:
   copying the data from the particular blocks to the new extent;
   storing data corresponding to the write in the particular blocks; and updating the new entry to identify the new extent, and include an original timestamp corresponding to the data stored in a corresponding block.

7. The method as recited in claim 1, wherein the extent map is stored in a B-tree, wherein each node of the B-tree includes a key comprising an offset and a timestamp associated with a time of an update of a corresponding extent map entry.

8. A computing system comprising:
a computing device; and
a storage device comprising a plurality of allocable blocks for storing data;
wherein the computing device is configured to:
allocate one or more of the blocks for use in storing data corresponding to a file;
store the file data in the blocks;
update an inode corresponding to the file responsive to said allocating, the inode including attributes and an extent map corresponding to the file, the inode being configured to simultaneously identify multiple versions of the file corresponding to multiple points in time, wherein the update includes adding data to the inode which identifies the one or more blocks;
in response to detecting a write to the file, subsequent to said updating, is directed to particular blocks of the one or more blocks:
allocate one or more new blocks for use in storing data which corresponds to the file;
create a new entry in the extent map of the inode which identifies the new blocks, said new entry being simultaneously maintained along with entries of the one or more entries in the extent map;
update a first entry of the extent map to identify the particular blocks to which the write was directed and a time at which the write occurred;
wherein said extent map simultaneously maintains entries for multiple updates which have been made to the file at multiple points in time, and wherein each entry of the extent map includes a key comprising an offset to corresponding data within the file and a timestamp associated with a time of an update of a corresponding extent map entry;
in response to detecting the write corresponds to one or more blocks of an original extent:
split the original extent at a first block corresponding to the beginning of the write; and
split the original extent at a last block corresponding to the end of the write.

9. The computing system as recited in claim 8, wherein the computing system does not store multiple copies of a given block for a particular file which are common to multiple versions of the particular file.

10. The computing system as recited in claim 9, wherein the first entry is the new entry, and wherein the method further comprises storing data corresponding to the write in the new blocks.

11. The computing system as recited in claim 10, wherein the first entry is an entry corresponding to at least one of the particular blocks, and wherein the computing device is further configured to:
copy the data from the particular blocks to the new blocks;
store data corresponding to the write in the particular blocks; and
update the new entry to identify at least one of the new blocks, and include an original timestamp corresponding to the data stored in a corresponding block.

12. The computing system as recited in claim 8, wherein the first entry is the new entry and the new blocks comprise a new extent, and wherein the method further comprises storing data corresponding to the write in the new extent.

13. The computing system as recited in claim 8, wherein the new blocks comprise a new extent and the first entry is an entry corresponding to at least one of the particular blocks, and wherein the computing system is further configured to:
copy the data from the particular blocks to the new extent;
store data corresponding to the write in the particular blocks; and
update the new entry to identify the new extent, and include an original timestamp corresponding to the data stored in a corresponding block.

14. The computing system as recited in claim 8, wherein the extent map is stored in a B-tree, wherein each node of the B-tree includes a key comprising an offset and a timestamp associated with a time of an update of a corresponding extent map entry.

15. A computer readable storage medium comprising program instructions, wherein the program instructions are executable to:
allocate one or more of the blocks for use in storing data corresponding to a file;
store the file data in the blocks;
update an inode corresponding to the file responsive to said allocating, the inode including attributes and an extent map corresponding to the file, the inode being configured to simultaneously identify multiple versions of the file corresponding to multiple points in time, wherein the update includes adding data to the inode which identifies the one or more blocks;
in response to detecting a write to the file, subsequent to said updating, is directed to particular blocks of the one or more blocks:
allocate one or more new blocks for use in storing data which corresponds to the file;
create a new entry in the extent map of the inode which identifies the new blocks, said new entry being simultaneously maintained along with entries of the one or more entries in the extent map;
update a first entry of the extent map to identify the particular blocks to which the write was directed and a time at which the write occurred;
wherein said extent map simultaneously maintains entries for multiple updates which have been made to the file at multiple points in time, and wherein each entry of the extent map includes a key comprising an offset to corresponding data within the file and a timestamp associated with a time of an update of a corresponding extent map entry;
in response to detecting the write corresponds to one or more blocks of an original extent:
split the original extent at a first block corresponding to the beginning of the write; and
split the original extent at a last block corresponding to the end of the write.

16. The computer readable storage medium as recited in claim 15, wherein the storage medium for use in storing data does not store multiple copies of a given block for a particular file which are common to multiple versions of the particular file.

17. The computer readable storage medium as recited in claim 16, wherein the extent map is stored in a B-tree, wherein each node of the B-tree includes a key comprising an offset and a timestamp associated with a time of an update of a corresponding extent map entry.

* * * * *